US006864459B2

(12) United States Patent
Chang et al.

(10) Patent No.: US 6,864,459 B2
(45) Date of Patent: Mar. 8, 2005

(54) HIGH PRECISION, RAPID LASER HOLE DRILLING

(75) Inventors: Jim J. Chang, San Ramon, CA (US); Herbert W. Friedman, Oakland, CA (US); Brian J. Comaskey, Walnut Creek, CA (US)

(73) Assignee: The Regents of the University of California, Oakland, CA (US)

( * ) Notice: Subject to any disclaimer, the term of this patent is extended or adjusted under 35 U.S.C. 154(b) by 177 days.

(21) Appl. No.: 09/781,073

(22) Filed: Feb. 8, 2001

(65) Prior Publication Data

US 2002/0104831 A1 Aug. 8, 2002

(51) Int. Cl.[7] .............................................. B23K 26/00
(52) U.S. Cl. ............................. 219/121.71; 219/121.76
(58) Field of Search ......................... 219/121.7, 121.71, 219/121.76, 121.8; 430/9

(56) References Cited

U.S. PATENT DOCUMENTS

| 4,870,244 | A | | 9/1989 | Copley et al. ............ 219/121.7 |
| 5,166,493 | A | * | 11/1992 | Inagawa et al. ........ 219/121.71 |
| 5,223,692 | A | * | 6/1993 | Lozier et al. ........... 219/121.67 |
| 5,741,096 | A | | 4/1998 | Olds ........................... 408/1 R |
| 5,747,769 | A | * | 5/1998 | Rockstroh et al. ...... 219/121.71 |
| 5,841,099 | A | * | 11/1998 | Owen et al. ............ 219/121.69 |
| 6,057,525 | A | * | 5/2000 | Chang et al. ........... 219/121.73 |
| 6,070,813 | A | * | 6/2000 | Durheim ................... 239/533.2 |
| 6,172,331 | B1 | | 1/2001 | Chen ....................... 219/121.71 |
| 6,407,363 | B2 | * | 6/2002 | Dunsky et al. ......... 219/121.71 |
| 6,462,306 | B1 | * | 10/2002 | Kitai et al. ............. 219/121.77 |

FOREIGN PATENT DOCUMENTS

| DE | 101 49 559 A1 | * | 4/2002 |
| WO | WO 89/01842 | * | 3/1989 |

OTHER PUBLICATIONS

Jim J. Chang, et al., "Precision Micromachining with Pulsed Green Lasers," Journal of Laser Applications, vol. 10, No. 6, Dec. 1998, pp. 285–291.

\* cited by examiner

*Primary Examiner*—Kiley S. Stoner
*Assistant Examiner*—Len Tran
(74) *Attorney, Agent, or Firm*—Eddie E. Scott; Alan H. Thompson

(57) ABSTRACT

A laser system produces a first laser beam for rapidly removing the bulk of material in an area to form a ragged hole. The laser system produces a second laser beam for accurately cleaning up the ragged hole so that the final hole has dimensions of high precision.

13 Claims, 3 Drawing Sheets

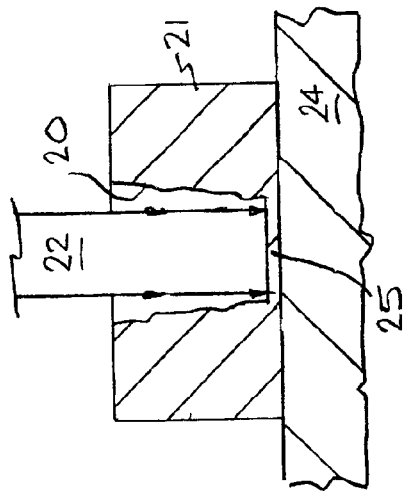
FIG. 5
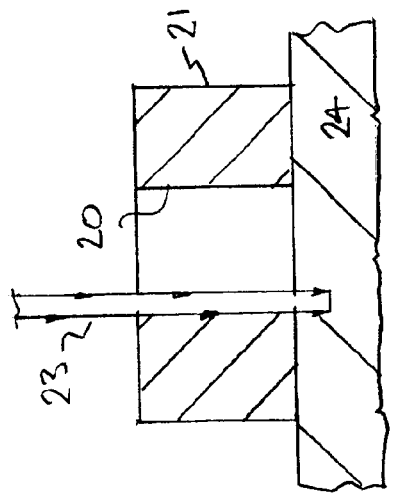
FIG. 6
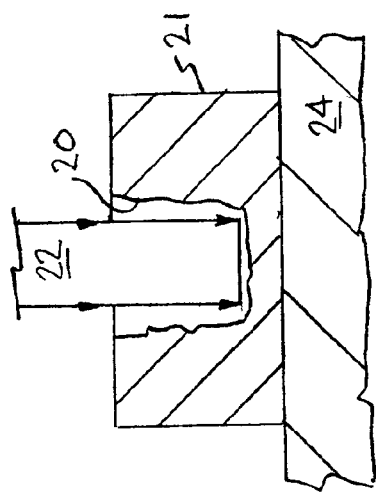
FIG. 7
FIG. 8

HIGH PRECISION, RAPID LASER HOLE DRILLING

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of Endeavor

The present invention relates generally to laser drilling, and more particularly to a method and apparatus for drilling a hole.

2. State of Technology

U.S. Pat. No. 6,172,331 for a method and apparatus for laser drilling by Xiangli Chen, patented Jan. 9, 2001, states, "Lasers are commonly used to drill holes in materials. In the aerospace and power generation industries for example, lasers are commonly used to drill air cooling holes in turbine airfoils such as blades and vanes. A pulsed laser beam is directed at the article, and molten material from the focus region of the laser beam is expelled from the article. According to one known method, a Nd:YAG laser generates pulses having a pulse energy of 10 joules, a pulse duration of 1 millisecond, and a pulse repetition rate of 10 Hz, to drill holes in hollow turbine blades. The pulses are generated in a "free running" mode in which the lamps are pulsed at 10 Hz to produce the pulsed laser beam."

The article, "Precision Micromachining with Pulsed Green Lasers," by Jim J. Chang, Bruce E. Warner, Ernest P Dragon, and Mark W. Martinez, *Journal of Laser Applications*, Vol. 10, No. 6, pages 285–321, Dec. 1998, states "Laser micromachining has found expanded use in automobile, aerospace, and electronics industries."

U.S. Pat. No, 4,870,244 for a method and device for stand-off laser drilling and cutting, by John Q. Copley et al, patented Sep. 26, 1989 shows a device for perforating material and a method of stand-off drilling using a laser. In its basic form a free-running laser beam creates a melt on the target and then a Q-switched short duration pulse is used to remove the material through the creation of a laser detonation wave. The advantage is a drilling/cutting method capable of working a target at lengthy stand-off distance. The device may employ 2 lasers or a single one operated in a free-running/Q-switched dual mode. Applicants believe that a disadvantage of this method is that with the high energy of the free running laser which produces the melt zone, there may be a large HAZ which may reduce the strength of the material surrounding the hole. Also, the dimension precision of the hole is likely to be poor.

U.S. Pat. No. 5,741,096 for a line-laser assisted alignment apparatus, by Stephen P. Olds, patented Apr. 21, 1998 shows a line laser assisted alignment apparatus that uses two laser line generators to define a reference axis that is aligned to coincide with an axis of a drill bit or other rotational tool. The reference axis of the alignment apparatus is matched with a marked position on a lower surface of an object that is to be worked by the drill bit or other rotational tool. Applicants believe that this technique improves the dimensional tolerance of the holes by aiding in the alignment process but is not involved with the other important features of precision hole drilling such as deep aspect ratios and minimal HAZ.

SUMMARY OF THE INVENTION

The present invention provides a system for drilling holes in a material. In one embodiment of the invention an apparatus includes a laser system that produces a first laser beam for rapidly removing the bulk of material in an area to form a ragged hole and a second laser beam for accurately cleaning up the ragged hole so that the final hole has dimensions of high precision. In another embodiment of the invention the first laser beam is an infra-red laser beam. The second laser beam is a low power, short wavelength laser beam.

An embodiment of the present invention provides a method producing a hole in a material using a first laser beam for rapidly removing the bulk of material in an area to form a ragged hole and a second laser beam for accurately cleaning up the ragged hole so that the final hole has dimensions of high precision. The method begins by the first laser operated in the ablative mode generating a first laser beam. The first laser beam is directed at the material where the hole is desired. The first laser beam removes the bulk of the material and begins the process of forming a hole. Subsequently a laser, operated in the trepanning mode, generates a second laser beam. The second laser beam is directed into the hole being formed to clean up the hole so that the resulting hole has dimensions of high precision.

An embodiment of the present invention provides a piece with a hole therein produced by the method of: generating a first laser beam, directing the first laser beam at the piece to remove the bulk of material in an area to form a ragged hole and begin forming the hole, generating a second laser beam, and directing the second laser beam at the hole being formed for accurately cleaning up the ragged hole so that the final hole has dimensions of high precision.

In an embodiment of the present invention provides a system for drilling a hole in a material using a laser system that produces a first laser beam for rapidly removing the bulk of material in an area to form a ragged hole and a second laser beam for accurately cleaning up the ragged hole so that the final hole has dimensions of high precision. The first laser beam is controlled so that the hole does not extend entirely through the material. A thin membrane is left at the bottom of the hole. The second laser beam breaks through the thin membrane at the bottom of the hole.

Other features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description and by practice of the invention.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

FIG. 5 illustrates the beginning of the process of drilling of a hole with the feature of leaving a membrane at the bottom of the hole to reduce transmitted laser energy.

FIG. 6 illustrates an intermediate step in the drilling of a hole with the feature of leaving a membrane at the bottom of the hole to reduce transmitted laser energy.

FIG. 7 illustrates an intermediate step in the drilling of a hole with the feature of leaving a membrane at the bottom of the hole to reduce transmitted laser energy.

FIG. 8 illustrates the final step in the drilling of hole with the feature of leaving a membrane at the bottom of the hole to reduce transmitted laser energy.

DETAILED DESCRIPTION OF THE INVENTION

Figure 1:
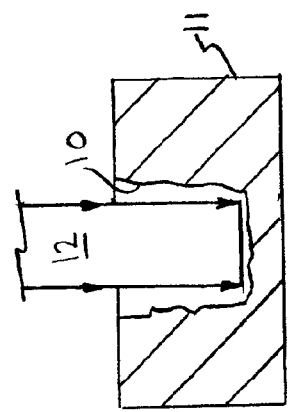
FIG. 1 illustrates the beginning of the process of drilling of a hole with the use of 250 $\mu$m percussive laser.

Referring now to the drawings, specific embodiments of the invention are shown. The detailed description of the specific embodiments, together with the general description of the invention, serve to explain the principles of the invention. The present invention provides a system for drilling holes in a material. A laser system produces a first laser beam for rapidly removing the bulk of material in an area to form a ragged hole. The hole is "ragged" in the sense that some material ablated from the bottom of the hole condenses on the sides of the hole. It is this recast layer which gives the hole its ragged appearance. The laser system produces a second laser beam for accurately cleaning up the ragged hole so that the final hole has dimensions of high precision.

In an embodiment of the invention the first laser is a high power infrared laser with moderate beam quality, on the order of 10 times the diffraction limit. The infrared laser is focused to a diameter slightly smaller than the diameter of the hole to be drilled. The second laser is a low power, short wavelength laser with near diffraction limited beam quality. This short wavelength laser is focused to a spot diameter which is about 10 times smaller than the hole diameter. The drilling system begins by operating the first laser at a peak power sufficiently high to be in the ablative mode. The first laser beam is focused to slightly smaller than the finished hole size and is directed at the material where the hole is desired. The first laser beam removes the bulk of the material and begins the process of forming a hole. Subsequently a second laser, operated in the trepanning mode, generates a second laser beam. This second laser is also operated at a peak power sufficiently high be in the ablative mode but since the spot diameter of this beam is approximately 10 times smaller than the hole, the peak power can be 100 times lower. The second laser beam is directed into the hole being formed to clean up the hole so that the resulting hole has dimensions of high precision.

In an embodiment of the invention piece with a hole therein is produced by the method of: generating a first laser beam, directing the first laser beam at the piece to remove the bulk of material in an area to form a ragged hole and begin forming the hole, generating a second laser beam, and directing the second laser beam at the hole being formed for accurately cleaning up the ragged hole so that the final hole has dimensions of high precision. In another embodiment of this invention, the first laser is stopped just before the beam penetrates through the material leaving a thin membrane at the bottom of the hole. This can be easily accomplished by counting the number of pulses needed to break through the substrate and ceasing lasing just prior to that point. The trepanning laser is then used to clean up the sides of the hole and improve dimensional precision as before but the thin membrane acts as a beam stop preventing laser energy from being transmitted through the hole. At the end of the trepanning step the short wavelength laser breaks through the membrane and cleans up the bottom of the hole. With this technique, the amount of laser energy transmitted through the hole is minimized. This feature is of great importance to many industrial applications where sensitive material is located at the back side of the substrate.

Background Information

It is important in many applications to drill small holes in thick materials with high precision and high throughput. Another important requirement is that the Heat Affected Zone (HAZ) be kept to a minimum. These requirements have led workers to operate lasers at the threshold of the ablative mode wherein a plasma formed at the surface carries material away but the heat transferred to the surface is kept to a minimum.

"Ablative" processing occurs when the thermal diffusion time of the material is long compared to the laser pulse duration leading to an accumulation of energy which if sufficiently large, can be partially released by the ablation of some material. There are essentially two regimes in which to operate lasers in the ablative mode: bulk hole drilling, which in the ablative mode is referred to "percussion drilling" and trepanning.

In percussion drilling, the shape of the laser spot is essentially the same as the hole to be drilled, i.e., a round laser beam spot for round holes, square for square holes, etc. Material is removed by ablation which imposes thresholds and limits on the laser flux. Deep holes with high aspect ratios pose a problem because the ablative material can redeposit on the walls of the hole causing a taper or other irregularities. The beneficial feature of this method is that material removal is rapid and with little HAZ.

To obtain precise holes, i.e., with less taper and higher dimensional precision, trepanning is often used. In this method, the laser is focused to a spot much smaller than the diameter of the hole. The laser beam is then traced around the outline of the hole usually many times until the hole is finally cut through the material. There is little recast material on the sides of the hole and the laser can be used to polish the sides of the hole to obtain high dimensional precision. Holes of arbitrary shape can be drilled in this manner with x-y control of the beam path.

The problem with conventional trepanning is that the drilling speed is low. This is because the central plug must be heated and extracted by melting and vaporization; this process is energy intensive and therefore drilling times are long. The remaining recast layer formed on the edges of the hole are then removed by ablative laser trimming during the later portions of the trepanning process. For many applications where precision holes are required, the slow drilling speed can be tolerated.

In certain application it is important that the first laser is stopped just before the beam penetrates through the material leaving a thin membrane at the bottom of the hole. This can be easily accomplished by counting the number of pulses needed to break through the substrate and ceasing lasing just prior to that point. The trepanning laser is then used to clean up the sides of the hole and improve dimensional precision as before but the thin membrane acts as a beam stop preventing laser energy from being transmitted through the hole. At the end of the trepanning step the short wavelength laser breaks through the membrane and cleans up the bottom of the hole.

With this technique, the amount of laser energy transmitted through the hole is minimized. This feature is of great importance to many industrial applications where sensitive material is located at the back side of the substrate. For example, sensitive materials are used for the formation of thin film transistors on inexpensive plastic substrates. Lower processing temperatures are required so that inexpensive flexible plastic substrates may be used. The so-called low-temperature plastic substrates have several advantages over conventionally used substrates such as glass, quartz, and silicon. Processing temperatures are such that sustained temperatures are below a temperature of 120° C. Plastic substrates have several advantages over conventional substrates, such as glass or silicon in that plastic can be much less expensive, lighter, more durable, rugged, and flexible. They have many and varied uses. For example, plastic displays and microelectronic circuits on flexible, rugged plastic substrates constructed in accordance with the present invention have multiple uses such as in field-deployable portable electronics, battlefield operations facilities, and the interior of ships, tanks and aircraft. Large area plastic displays are in need for high resolution large area flight simulators. Flexible detector arrays have use in radiation (X-ray, gamma-ray) detection. Silicon-on-insulator films may be used in radiation-hardened IC circuits. Many other uses exist and the development of the invention will produce additional uses.

Referring to FIGS. 1, 2, 3, and 4 the drilling of a hole in a material using the percussive-trepanning method is illustrated. Small holes with precise shapes and precision dimensions are quickly drilled in many materials using the combination of an infra-red laser with relatively moderate beam quality and a low power, short wavelength laser with relatively high beam quality. The infrared laser operates in the ablative mode and removes the bulk of the material quickly with little regard to the precise dimensions of the hole. The hole is described as "ragged" in the sense that some material ablated from the bottom of the hole condenses on the sides of the hole. It is this recast layer which gives the hole its ragged appearance. The short wavelength laser is operated in the trepanning mode to complete the hole in rapid time. The resulting hole has dimensions of high precision, along with high aspect ratio as necessary. Some of the important features of the hole drilling methodology of the present invention are the dimensional precision of the holes, the ability to drill high aspect ratio holes (aspect ratio being defined as the ratio of depth to diameter) and the minimization of the Heat Affected Zone (HAZ) surrounding the hole.

In order to provide for high precision holes with high drilling speed, the present invention provides a combination of percussive and trepanning modes. A pulsed IR laser is operated at a flux sufficient to exceed the ablative threshold but only slightly above that limit order to avoid a large HAZ. It should be noted that a larger HAZ can be tolerated in the first step of this process in the present invention than if percussive drilling were the sole agent. The percussive laser need not be operated at short wavelength and with high wavefront quality because the subsequent trepanning step can correct drilling errors caused by these laser characteristics. The use of such an IR laser significantly reduces the cost and complexity of the laser equipment which again is an advantage for commercial applications.

With the central part of the hole removed, the laser system switches to a visible wavelength with high wavefront quality but at significantly lower average power and the recast material is removed by a trepanning process. Irregularities in the dimensional precision left over from the percussive process are removed by this trepanning process. In order to maintain the laser flux above the ablative threshold, the beam size is reduced (assuming the pulse duration remains fixed) and this is possible because the wavelengh is reduced and the wavefront quality is increased.

Figure 9:
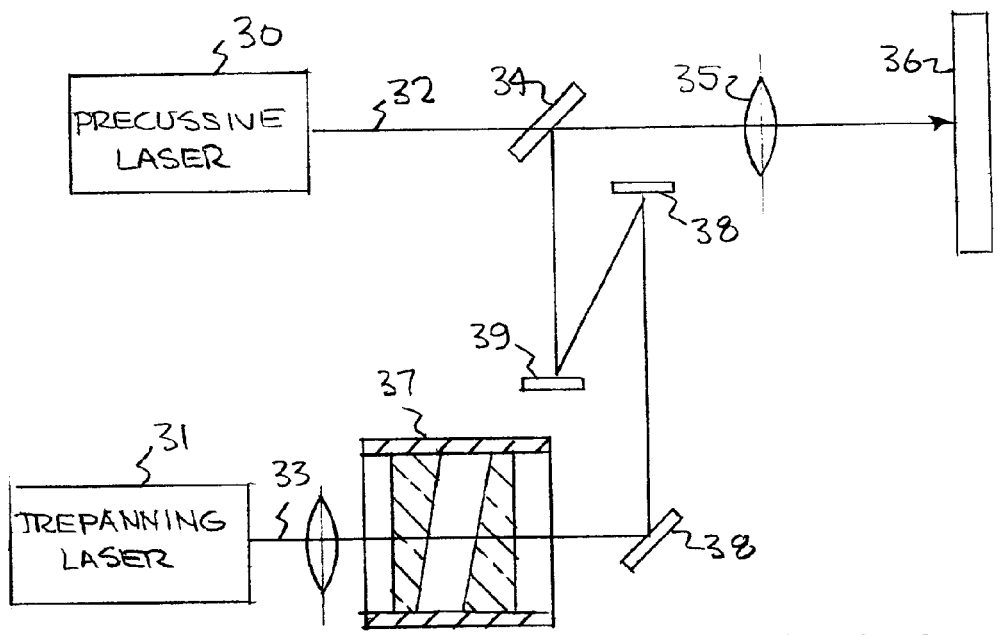
FIG. 9 shows a system of combining two lasers for hole drilling.
Figure 10:
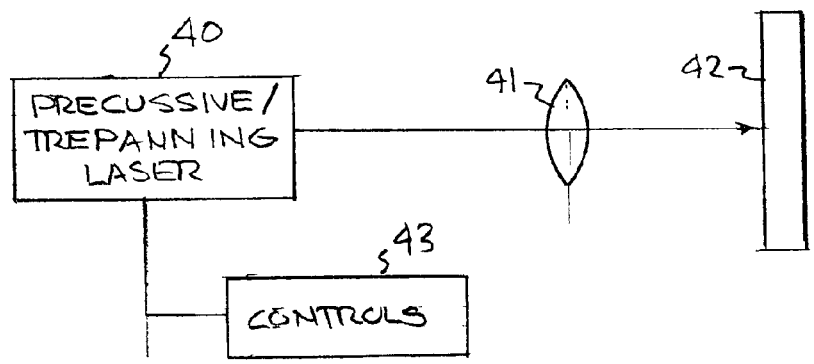
FIG. 10 shows a system utilizing a single laser for hole drilling.

FIGS. 9 and 10 show two laser systems that can be used to combine both the percussive and trepanning laser. In FIG. 9 a percussive laser 30 produces a percussive laser beam 32 and a trepanning laser 31 produces a laser trepanning beam 33. The percussive laser beam 32 passes through the dichroic beam combining optic 34 and is focussed onto the substrate 36 by focussing lenses 35. The trepanning laser beam 33 passes through a pair of wedges 37 which give the beam an angular offset which can be adjusted by rotating one wedge with respect to the other. In the diagram, the wedges are adjusted to give zero angular offset but a slight translational offset. The translational offset is corrected by the "Pointing and Centering" mirror pair 39 to bring the trepanning beam back on line with the percussive laser beam after reflecting off the dichoric beam combining optic 34. The turning mirror 38 and dichroic optics 34 could be used as a P&C leg but for clarity, separate mirrors are chosen for this purpose.

With zero angular offset, the trepanning laser beam falls into the center of the hole drilled by the percussive laser and there is no cleanup of the sidewalls. By rotating the wedges with respect to each other and angular offset is introduced which results in an translational offset at the location of the hole by the action of the focussing optic. The wedges are adjusted until the offset is the radius of the desired hole and the entire wedge assembly is rotated by a small motor until the trepanning action has accomplished its task. This optical setup is not unique nor original to this invention but serves to illustrate how the percussive-trepanning technique might be accomplished.

In FIG. 10 the percussive laser beam and the trepanning laser beam are produced by a single laser system 40. A control system 43 provides information to laser system 40. Laser system 40 produces a first laser beam for rapidly removing the bulk of material in an area to form a ragged hole and a second laser beam for accurately cleaning up the ragged hole so that the final hole has dimensions of high precision. The laser beams are focussed onto the substrate material 42 by focussing lenses 41.

Figure 2:
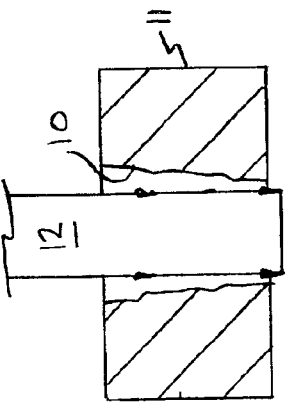
FIG. 2 illustrates an intermediate step in the drilling of a hole with the use of a 250 $\mu$m percussive laser.
Figure 3:
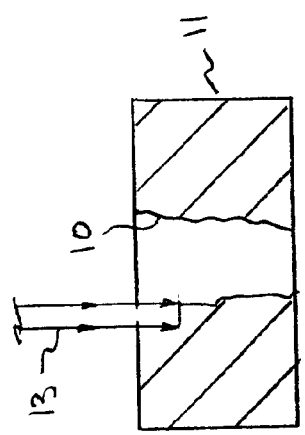
FIG. 3 illustrates an intermediate step in the drilling of hole with the use of a trepanning laser.
Figure 4:
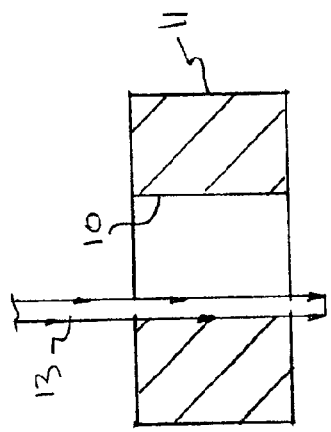
FIG. 4 illustrates the final step in the drilling of hole with the use of a trepanning laser.

An illustrative representation of this process is shown in FIGS. 1, 2, 3, and 4. FIG. 1 illustrates the beginning of the process of drilling of a hole 10 with the use of 250 $\mu$m percussive laser. FIG. 2 illustrates an intermediate step in the drilling of the hole 10. FIG. 3 illustrates an intermediate step in the drilling of hole 10 with the use of a trepanning laser. FIG. 4 illustrates the final step in the drilling of hole 10 with the use of a trepanning laser.

For specificity, a 300 $\mu$m hole 10 is depicted in a 1 mm thick material 11 using a 250 $\mu$m percussive laser at 1.06 $\mu$m as shown in FIGS. 1 and 2 followed by a trepanning laser with a beam diameter of 25 $\mu$m at 532 nm as show in FIGS. 3 and 4. The percussive laser beam is designated by the reference numeral 12 and the trepanning laser beam is designated by the reference numeral 13. For very fine scale trepanning such as might be needed to cut corners in square or other shaped holes, an even shorter wavelength might be used. For example, the 1.06 $\mu$m percussive laser can be the fundamental of Diode Pumped Solid State Laser using a Nd:YAG gain media, the trepanning laser can be the second or third harmonic of that laser at 532 nm or 355 nm. Many such lasers exist but the highest power and most efficient unit is a Diode Pumped Solid State Laser (DPSSL) which uses a Compound Parabolic Concentrator (CPC). This laser is described in U.S. Pat. No. 5,978,407, Compact and Highly Efficient Laser Pump Cavity, J. J. Chang, I. L. Bass and L. E. Zapata, Nov. 2, 1999 and further improved in US Provisional Patent Application Serial No. 60/166,464, Diode-Pumped Laser Apparatus with Improved Pumping Design, J. J. Chang, filed Nov. 19, 1999.

At the ablative threshold, a 500 W average power IR laser is sufficient to cut through a millimeter thick sample of steel in a fraction of a second assuming a pulse duration of 100 ns. The trepanning laser need only have $\frac{1}{100}$ the average power for the same laser conditions assuming a beam diameter of 25 $\mu$m or 10 times smaller than the hole diameter. The entire process should take no more than a few seconds and result in high aspect ratio holes with high precision and negligibly small HAZ.

Characteristics of the Percussive Laser System

It has been shown by Chang, Warner, Dragon and Martinez, Ibid, that the optimum flux for the percussive drilling technique are of the order of a GW/cm$^2$. Too low a flux results in pure heating of the substrate with no ablation and hence low material removal rates. Too high a flux and the ablated material begins to photoionize, absorb the laser beam and otherwise reduce the laser flux at the substrate. Essentially, the optimum operating point is just above the ablation threshold.

For a repetitively pulsed laser, the flux at the substrate, $\phi$ is given by:

$$\phi = <P>/[(PRF)(\Gamma_p)(\pi d^2/4)]$$

where: $<P>$=the average power
$\Gamma_p$=pulse duration
d=hole diameter

For a typical DPSSL, PRF=10 kHz and $\Gamma_p$=80 ns. Under these conditions and the requirement of 1 GW/cm$^{2'}$, the average power of the laser required for a 300 $\mu$ diameter hole is $\approx$500W. For the observed removal rate observed of 1 $\mu$m/pulse, a 1 mm hole with be drilled in 1000 pulses or 0.1 s. This rapid drilling out of the core hole allows a thorough and careful finishing process with the trepanning laser while still maintaining a high production throughput.

Although DPSSL's of this power level do exit, their beam quality is not sufficient to produce "reasonable" quality holes, even with the trepanning step to follow. A beam quality of $M^2 \approx 10$–15 is needed as opposed to the 50–100 which has been measured for these lasers. This requirement for the beam quality is as result of the observation that the spot diameter of the laser is given by:

Spot diameter$\approx$(XDL) $F_\# \lambda$

Where (XDL) is the beam quality is normalized to the Diffraction Limited performance, $F_\#$ is the "F number" of the optical focusing system and $\lambda$ is the wavelength of the laser. For a 300 $\mu$m diameter and $F_\#$=20 (to insure a reasonable standoff distance and a long depth of focus) the XDL required at 1.06 $\mu$m is 15.

A common technique to improve the beam quality is to place a polarization rotator in between two of these laser to cancel out birefringence effects induced by the thermal gradients in the rods. Although this technique alone is not sufficient to produce near diffraction limited wavefronts due to the simultaneous presence of thermal lensing, the goal here is only 10–15 times diffraction limited and the polarization rotation technique will be sufficient.

Characteristics of the Trepanning Laser System

Although it would be possible to use the IR wavelength for the trepanning laser, the benefits of the shorter wavelength obtained by SHG to the green or Third Harmonic Generation to the UV far outweigh the difficulties encountered to produce these wavelengths. The shorter wavelength has higher machining precision (if the wavefront quality is comparable to that in the IR and even better if the wavefront can be improved) and increased coupling to the substrate, all resulting in a superior trepanning device. Further, since only a few tens of watts of average power are required, it is relatively easy to use apertures to improve the wavefront quality to a figure of about 2 times the diffraction limit at the ten watt level.

Efficient and powerful DPSSL's with SHG to the green have been developed as described in "315 W Pulsed—Green Generation with a Diode—Pumped Nd:YAG Laser'" Chang, J. J., Dragon, E. P., Bass, I. L., CLEO'98. Using apertures to restrict the lasing portion of the YAG rod, wavefront qualities of $\approx$2 times diffraction limited have been achieved at levels of a few tens of watts. Various resonator cavity configurations have been developed for these lasers including those characterized by "L", "Z" and "V" geometries, each suited to improve a specific laser characteristic, e.g., short pulse duration, good wavefront quality or high average power.

The use of two wavelengths and two modes of drilling can produce high precision holes with large aspect ratios and high drilling rates. A long wavelength laser in the IR is operated in the percussive mode and achieves material removal rates of $\approx$1 $\mu$pulse. This process leaves a hole with irregular edges caused by material recast. The recast layer is removed and the sides of the hole polished using a short wavelength laser operated in the trepanning mode. The combination of these two modes is superior to either mode used separately.

For example if it is required to drill a hole 300 microns in diameter, 1 mm deep in an aerospace alloy and that must be straight, i.e., no taper, to 2%, and round to 2%, a relatively inexpensive, commercially available, near IR laser operating at a few hundred watts can percussion drill this hole in less than a second. However, the quality of the hole is far from the requirements specified. Splatter and recast material make the hole irregular and tapered. A visible laser with good beam quality operating at tens of watts could cut the hole to the level of precision desired by trepanning (see reference Chang, Warner, Dragon and Martinez, Ibid) but would require over a hundred seconds to complete because of the slow removal rate and the need to melt out the middle of the hole. By using the lasers together in the percussion-trepanning modes, the near IR laser can remove most of the hole material and the visible laser can do the finishing operation in a total of a few seconds.

There are other applications where more than one laser would be an advantage. Some materials, ceramics for instance, are difficult to cut with near IR lasers. By combining a low power UV laser with the more powerful IR laser we propose that this problem can be solved in an economic and efficient manner. The UV laser could provide the necessary high energy photons to break down the ceramic and a visible o IR laser could provide the removal mechanism.

There may be applications where three lasers would be an advantage. Composites may be readily cut with a laser trio. A UV laser to decompose the polymer, a visible laser for trepanning, and near IR laser for bulk removal. Other applications could readily be explored.

Referring to FIGS. 5, 6, 7, and 8 the process by which a thin membrane 25 is left at the bottom of the hole 20 is shown. The infrared laser beam 22 can remove almost all of the interior of the hole 20 leaving only a thin membrane 25 at the bottom. The lower power short wavelength laser beam 23 can then trepan the hole cleaning up the edge and removing the membrane 25 at the same time thereby reducing the amount of laser light which exits the hole 20. In some industrial applications, there are critical elements behind the hole 20 which cannot be exposed to high power laser light. FIG. 5 illustrates the beginning of the process of drilling of the hole 20. FIG. 6 illustrates an intermediate step in the drilling of a hole leaving a membrane 25 at the bottom of the hole 20 to reduce transmitted laser energy. FIG. 7 illustrates an intermediate step in the drilling of the hole 20. FIG. 8 illustrates the final step in the drilling of hole 10.

After drilling by the percussive laser, the trepanning laser then cleans up the sides of the hole before breaking through the membrane 25. A 300 $\mu$m hole 20 is depicted in a 1 mm thick material 11 using a 250 $\mu$m percussive laser at 1.06 $\mu$m as shown in FIGS. 5 and 6 followed by a trepanning laser with a beam diameter of 25 $\mu$m at 532 nm as show in FIGS. 7 and 8. The percussive laser beam is designated by the reference numeral 22 and the trepanning laser beam is designated by the reference numeral 23.

In certain applications it is important that the first laser beam 22 is stopped just before the beam penetrates through the material 21 leaving a thin membrane 25 at the bottom of the hole 20. This can be easily accomplished by counting the number of pulse needed to break through the substrate material 21 and ceasing lasing just prior to that point. The trepanning laser is then used to clean up the sides of the hole 20 and improve dimensional precision as before but the thin membrane 25 acts as a beam stop preventing laser energy from being transmitted through the hole 20. At the end of the trepanning step the short wavelength laser breaks through the membrane 25 and cleans up the bottom of the hole 20.

With this technique, the amount of laser energy transmitted through the hole is minimized. This feature is of great importance to many industrial applications where sensitive material 24 is located at the back side of the substrate material 21. For example, sensitive materials are used for the formation of thin film transistors on inexpensive plastic substrates. Lower processing temperatures are required so that inexpensive flexible plastic substrates may be used. The so-called low-temperature plastic substrates have several advantages over conventionally used substrates such as glass, quartz, and silicon. Processing temperatures are such that sustained temperatures are below a temperature of 120° C. Plastic substrates have several advantages over conventional substrates, such as glass or silicon in that plastic can be much less expensive, lighter, more durable, rugged, and flexible. They have many and varied uses. For example, plastic displays and microelectronic circuits on flexible, rugged plastic substrates constructed in accordance with the present invention have multiple uses such as in field-deployable portable electronics, battlefield operations facilities, and the interior of ships, tanks and aircraft. Large area plastic displays are in need for high resolution large area flight simulators. Flexible detector arrays have use in radiation (X-ray, gamma-ray) detection. Silicon-on-insulator films may be used in radiation-hardened IC circuits. Many other uses exist and the development of the invention will produce additional uses.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of drilling a hole in a material, said hole to have a final diameter, wherein said material has a back side and a second material is located at said back side, comprising: the steps of:

generating a first laser beam and generating a second laser beam, said step of generating a first laser beam comprising generating a first high power percussive laser beam that has greater power than said second laser beam, said first high power percussive laser beam producing a first level of power and said first high power percussive laser beam being focused to a first high power percussive laser beam spot diameter that is slightly smaller than said final diameter of said hole, directing said first high power percussive laser beam at said material to remove the bulk of said material to form a ragged hole having a diameter slightly smaller than said final diameter of said hole, said step of directing said first high power percussive laser beam at said material to remove the bulk of said material to form a ragged hole being accomplished by using said first high power percussive laser beam spot diameter to directly form said ragged hole without trepanning, said step of directing said first high power percussive laser beam at said material to remove the bulk of said material to form a ragged hole being stopped before said ragged hole reaches said back side and before said ragged hole reaches said second material thereby leaving a thin membrane of said material between said ragged hole and said second material, said step of generating a second laser beam comprising generating a second and trepanning laser beam that has less power than said first laser beam, said second and trepanning laser beam producing a second level of power that is less than said first level of power and said second and trepanning laser beam having a spot diameter substantially smaller than said diameter of said hole, and directing and trepanning by tracing said second and trepanning laser beam along said diameter and at said hole being formed for expanding said ragged hole having a diameter slightly smaller than said final diameter of said hole so that said hole is at said final diameter and for accurately cleaning up said ragged hole so that said final hole has said final diameter and has dimensions of high precision and directing and trepanning said second and trepanning laser beam through said thin membrane of said material so that said final hole extends to said second material.

2. The method of drilling a hole in a material of claim 1 wherein said first laser beam is an infra-red laser beam.

3. The method of drilling a hole in a material of claim 1 wherein said second laser beam is a low power, short wavelength laser beam.

4. The method of claim 2 wherein said infra-red laser beam is produced by a laser operated in the ablative mode.

5. The method of claim 3 wherein said low power, short wavelength laser beam is produced by a laser operated in the trepanning mode.

6. The method of drilling a hole in a material of claim 1 wherein said first laser beam is an infra-red laser beam and said second laser beam is a low power, short wavelength laser beam.

7. The method of drilling a hole in a material of claim 1 wherein said second laser beam laser is focused to a spot a number of times smaller than the diameter of said ragged hole and said second laser beam is traced around the said ragged hole a multiplicity of times until there is little ragged material on the sides of said ragged hole.

8. The method of drilling a hole in a material of claim 7 wherein said second laser beam laser focused to a spot from one to ten times smaller than the diameter of said ragged hole and is used to polish the sides of said hole to obtain high dimensional precision.

9. The method of drilling a hole in a material of claim 1 wherein said first laser beam is produced by a first laser and said second laser beam is produced by a second laser.

10. The method of drilling a hole in a material of claim 1 wherein said first laser beam and said second laser beam are produced by a single laser.

11. The method of drilling a hole in a material of claim 1 including using a laser to produce said first laser beam and controlling said laser so that said first laser beam for rapidly removing the bulk of material in an area to form a ragged hole does not reach said backside and does not extend entirely through said material leaving a thin membrane of said material between said ragged hole and said second material.

12. The method of drilling a hole in a material of claim 11 including controlling said laser so that said first laser beam said ragged hole is stopped before it reaches said backside and so that the ragged hole does not extend entirely through said material and said first laser beam leaves a thin membrane at the bottom of said hole between said ragged hole and said second material.

13. The method of drilling a hole in a material of claim 12 including controlling said second laser beam so that said second laser beam breaks through said thin membrane at the bottom of said hole so that said final hole extends to said second material.

* * * * *